(12) United States Patent
Danado et al.

(10) Patent No.: US 8,549,044 B2
(45) Date of Patent: Oct. 1, 2013

(54) RANGE-CENTRIC CONTEXTUAL INFORMATION SYSTEMS AND METHODS

(75) Inventors: José Carlos dos Santos Danado, Montemor-o-Novo (PT); Afonso Miguel Romeiras Lourenco Várzea Tavares, Setúbal (PT); João Pedro Gomes da Silva Frazão, Lisbon (PT); Ivan de Almeida Soares Franco, Almada (PT)

(73) Assignee: Ydreams—Informatica, S.A. Edificio Ydreams, Caparica (PT)

( * ) Notice: Subject to any disclaimer, the term of this patent is extended or adjusted under 35 U.S.C. 154(b) by 431 days.

(21) Appl. No.: 12/561,391

(22) Filed: Sep. 17, 2009

(65) Prior Publication Data

US 2011/0066646 A1    Mar. 17, 2011

(51) Int. Cl.
    *G06F 7/00*     (2006.01)
    *G06F 17/30*    (2006.01)

(52) U.S. Cl.
    USPC ........... 707/802; 707/803; 701/408; 701/409; 701/410; 701/300; 701/532

(58) Field of Classification Search
    USPC .............. 707/705, 736, 755, 756, 758, 999.1, 707/802, 803; 701/200, 201, 202, 207, 408, 701/409, 410, 532, 533, 300
    See application file for complete search history.

(56) References Cited

U.S. PATENT DOCUMENTS

| | | | |
|---|---|---|---|
| 6,006,096 A * | 12/1999 | Trompower | 455/456.2 |
| 6,026,371 A | 2/2000 | Beck et al. | 705/14 |
| 6,058,417 A | 5/2000 | Hess et al. | 709/219 |
| 6,415,320 B1 | 7/2002 | Hess et al. | 709/219 |
| 6,732,161 B1 | 5/2004 | Hess et al. | 709/219 |
| 7,007,076 B1 | 2/2006 | Hess et al. | 709/219 |
| 7,031,968 B2 | 4/2006 | Kremer et al. | 707/100 |

(Continued)

FOREIGN PATENT DOCUMENTS

| | | | |
|---|---|---|---|
| AU | 3594001 A | 9/2001 | G06F 17/30 |
| EP | 1264477 | 12/2002 | |

(Continued)

OTHER PUBLICATIONS www.popfly.com, Internet website, 5 pages, Apr. 19, 2008.

(Continued)

*Primary Examiner* — Hares Jami
(74) *Attorney, Agent, or Firm* — King & Spalding L.L.P.

(57) ABSTRACT

A computer implemented method for providing location-based services using a mobile device is provided. A first anchor is generated by sensing a location-identifying physical characteristic proximate to a mobile device present at a first location and generating a representation of the location-identifying physical characteristic; determining a descriptive identification of the first location; and combining the descriptive identification and the representation of the location-identifying physical characteristic. The first anchor is transmitted to a computer remote from the first location. A request is made to a remote computer for a chronotope retrieved from a database of previously generated anchors, the received chronotope indicating a logical distance between the first anchor and a second anchor, wherein the second anchor is associated with a second location distinct from the first location. Information including the logical distance between the first and second anchors indicated by the received chronotope is conveyed to a user of the mobile device.

23 Claims, 5 Drawing Sheets

(56) References Cited

U.S. PATENT DOCUMENTS

| | | | |
|---|---|---|---|
| 7,162,493 B2 | 1/2007 | Weiss et al. | 707/104 |
| 7,515,917 B2* | 4/2009 | Casey | 455/456.1 |
| 7,634,336 B2* | 12/2009 | Chae et al. | 701/28 |
| 2004/0249565 A1* | 12/2004 | Park | 701/200 |
| 2005/0037772 A1* | 2/2005 | Alger et al. | 455/456.1 |
| 2005/0278062 A1* | 12/2005 | Janert et al. | 700/214 |
| 2006/0229802 A1* | 10/2006 | Vertelney et al. | 701/200 |
| 2007/0291297 A1 | 12/2007 | Harmon et al. | 358/1.15 |
| 2007/0297029 A1 | 12/2007 | Low et al. | 358/527 |
| 2008/0033903 A1* | 2/2008 | Carol et al. | 707/1 |
| 2008/0059061 A1* | 3/2008 | Lee | 701/209 |
| 2008/0133126 A1* | 6/2008 | Dupray | 701/204 |
| 2008/0235569 A1 | 9/2008 | Arun et al. | 715/229 |
| 2008/0284648 A1* | 11/2008 | Takada et al. | 342/357.09 |
| 2009/0005979 A1* | 1/2009 | Nakao et al. | 701/210 |
| 2009/0097658 A1* | 4/2009 | Trinkel et al. | 380/277 |
| 2009/0287407 A1* | 11/2009 | Sheha et al. | 701/201 |
| 2009/0303036 A1* | 12/2009 | Sahuguet | 340/539.13 |
| 2011/0054776 A1* | 3/2011 | Petrov et al. | 701/201 |

FOREIGN PATENT DOCUMENTS

| | | | |
|---|---|---|---|
| EP | 1383043 | 1/2004 | G06F 9/44 |
| WO | 00/25218 | 5/2000 | G06F 13/00 |
| WO | 01/63919 | 8/2001 | H04N 5/91 |
| WO | 03/040939 | 5/2003 | G06F 15/00 |
| WO | 03/073235 | 9/2003 | |
| WO | 2005/008515 | 1/2005 | G06F 17/00 |
| WO | 2007/135688 | 11/2007 | G06F 19/00 |
| WO | 2008/012475 | 1/2008 | G06F 17/21 |
| WO | 2008/113690 | 9/2008 | G06F 17/24 |
| WO | 2008/116012 | 9/2008 | G06F 7/00 |

OTHER PUBLICATIONS

Conradi, R. et al., "Version Models for Software Configuration Management", Trondheim, Oct. 1995.

* cited by examiner ns and METHODS

RANGE-CENTRIC CONTEXTUAL INFORMATION SYSTEMS AND METHODS

TECHNICAL FIELD

The present disclosure relates generally to systems and methods relevant to location-based services. Location-based services may be rendered to a user by virtue of, or in reliance on, the location of the user. These services may, for example, be rendered by a mobile device.

BACKGROUND

At present location-based services (LBS) are typically provided based on geographical coordinates, typically expressed in degrees of latitude and longitude. Common mobile devices are capable of determining their location, in coordinate form, using technologies such as global positioning system (GPS) or other radio-based telemetry approaches. These approaches limit the usage of location-based services when relations other then distance are required, not allowing for the possibility of other semantics as base for the LBS.

SUMMARY

In accordance with the teachings of the present disclosure, disadvantages and problems associated with existing coordinate-based approaches have been reduced.

In certain embodiments, a computer implemented method for providing location-based services using a mobile device is provided. A first anchor is generated by sensing a location-identifying physical characteristic proximate to a mobile device present at a first location and generating a representation of the location-identifying physical characteristic; determining a descriptive identification of the first location; and combining the descriptive identification and the representation of the location-identifying physical characteristic. The first anchor is transmitted to a computer remote from the first location. A request is made to a remote computer for a chronotope retrieved from a database of previously generated anchors, the received chronotope indicating a logical distance between the first anchor and a second anchor, wherein the second anchor is associated with a second location distinct from the first location. Information including the logical distance between the first and second anchors indicated by the received chronotope is conveyed to a user of the mobile device.

In certain embodiments, software embodied in tangible computer-readable media is provided. The software is executable by a processor to: generate a first anchor by: sensing a location-identifying physical characteristic proximate to a mobile device present at a first location and generating a representation of the location-identifying physical characteristic; determining a descriptive identification of the first location; and combining the descriptive identification and the representation of the location-identifying physical characteristic; transmit the first anchor to a computer remote from the first location; request from the remote computer a chronotope retrieved from a database of previously generated anchors, the received chronotope indicating a logical distance between the first anchor and a second anchor, wherein the second anchor is associated with a second location distinct from the first location; and convey to a user of the mobile device information including the logical distance between the first and second anchors indicated by the received chronotope.

In certain embodiments, a computing system includes a processor, memory coupled to the processor, and a mobile application. The mobile application is enabled to generate a first anchor by: sensing a location-identifying physical characteristic proximate to a mobile device present at a first location and generating a representation of the location-identifying physical characteristic; determining a descriptive identification of the first location; and combining the descriptive identification and the representation of the location-identifying physical characteristic; transmit the first anchor to a computer remote from the first location; request from the remote computer a chronotope retrieved from a database of previously generated anchors, the received chronotope indicating a logical distance between the first anchor and a second anchor, wherein the second anchor is associated with a second location distinct from the first location; and convey to a user of the mobile device information including the logical distance between the first and second anchors indicated by the received chronotope.

In certain embodiments, a computer implemented method for providing location based services using a mobile device is provided. A first anchor is generated by sensing a first location-identifying physical characteristic proximate to a mobile device present at a first location and generating a representation of the first location-identifying physical characteristic, determining a descriptive identification of the first location, and combining the descriptive identification of the first location and the representation of the first location-identifying physical characteristic; transmitting the first anchor to a computer remote from the first location; generating a second anchor by: sensing a second location-identifying physical characteristic proximate to the mobile device present at a second location and generating a representation of the second location-identifying physical characteristic, determining a descriptive identification of the second location, and combining the descriptive identification of the second location and the representation of the second location-identifying physical characteristic; and transmitting the second anchor to the remote computer along with information indicating the time elapsed between sensing the first location-identifying physical characteristic and sensing the second location-identifying physical characteristic.

In certain embodiments, a computer implemented method for providing location based services is provided. A first anchor is received from a mobile device, which includes a representation of a first location-identifying physical characteristic proximate to a mobile device present at a first location, a descriptive identification of the first location, and a first timestamp. A second anchor is received from a mobile device, which includes a representation of a second location-identifying physical characteristic proximate to a mobile device present at a second location, a descriptive identification of the second location, and a second timestamp. A chronotope is automatically generated by linking the first anchor to the second anchor, and calculating the time difference between the first timestamp and the second timestamp. The chronotope is stored in a database.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
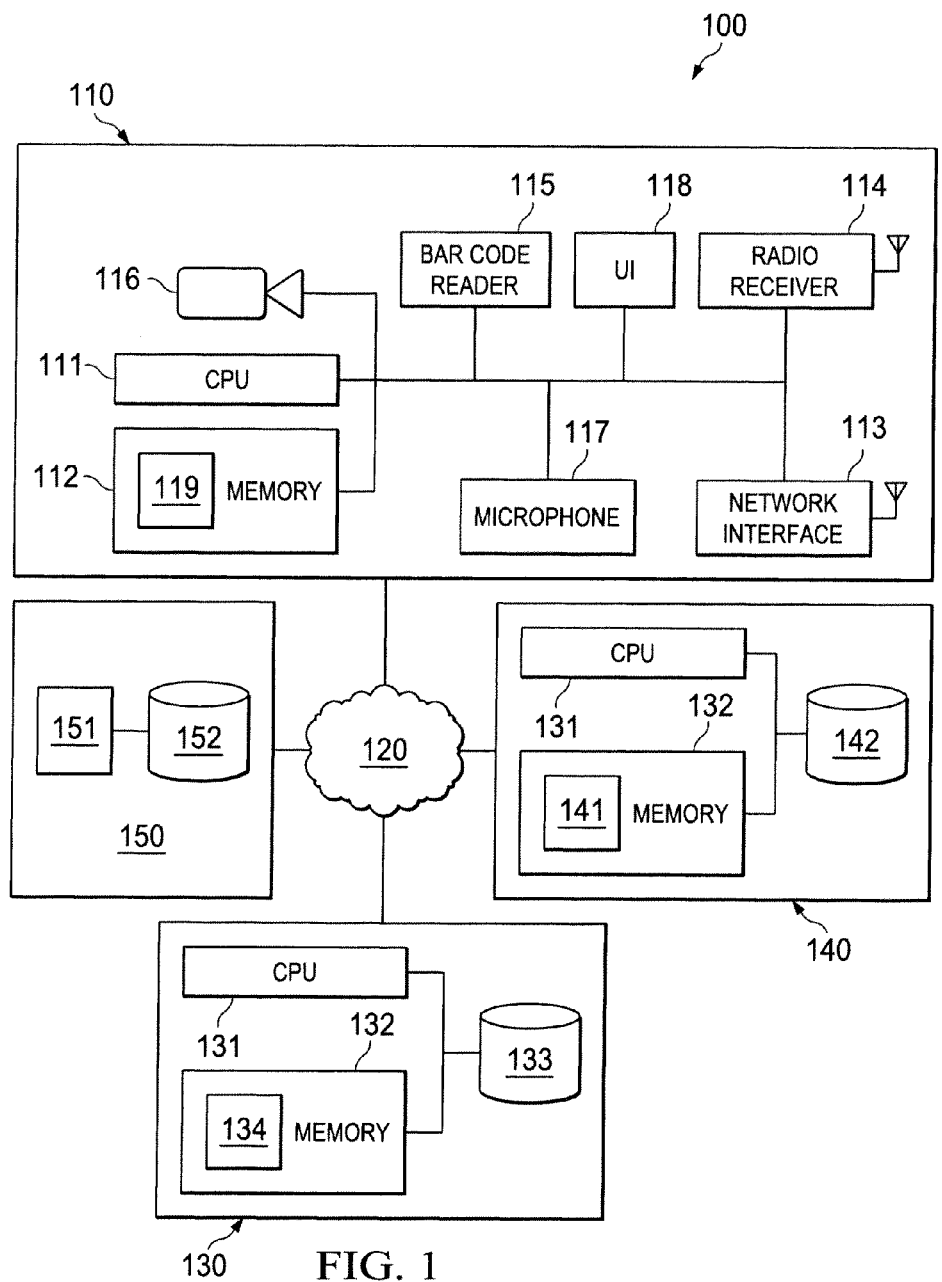
FIG. 1 illustrates a system for determining location information and providing services based on that information, according to an example embodiment of the present disclosure.

Preferred embodiments and their advantages over the prior art are best understood by reference to FIGS. 1-6 below. However, the present disclosure may be more easily understood in the context of a high-level description of certain embodiments.

The following non-limiting scenario may help the reader understand one or more aspects of the present invention. A user with a mobile device such as a mobile phone is visiting a city. The user is presently at a downtown coffee shop and would like to find a nearby museum to explore. The user accesses her mobile device to determine her present location. The coffee shop is readily identified because a wireless router is broadcasting a unique station identifier: COFFEEJO_WIFI. This location information may be represented as an anchor. The mobile device may then send this anchor information over a network connection, e.g., a GSM data connection, to a remote computer. If the remote computer does not yet have a record of this anchor, it creates one and requests a user-friendly name from the user. The mobile device prompts the user to create or validate a user-friendly name. Here, the user may edit the name "COFFEEJO_WIFI" and enter "Coffee Jo" instead, as that is the name on the awning of the coffee shop. This process allows the system to discover new locations, including transient or temporary locations, in an exploratory mode. This organic database development obviates the need to seed or pre-populate the remote database with anchor information.

Information regarding the range of the anchor as well as a friendly name is conveyed to the user. The user selects the anchor and enters a text query for "nearby museums." This information is transmitted by the mobile device to a remote service. The remote service then queries the remote computer for other anchors near the selected anchor and combines that information with a list of museums, thus generating a list of museums in proximity to the coffee shop anchor. The resulting search results may list two anchors, each identifying a museum when combined with the remote service museum list. The first is listed with a travel time of ten minutes by foot while the second is listed as fifteen minutes by taxi. The user decides to take a train to the second museum. When she arrives, she takes a picture of the front steps of the museum with her mobile device. The mobile device identifies the museum from the picture, generates an anchor for this location, and transmits to the remote computer the anchor along with a timestamp. Recorded anchors along the path allow the system to calculate travel time between anchors, thus also calculate her travel time from the coffee shop to the museum as twelve minutes, the user's mode of transport can also be added (e.g., the subway). The data structure representing the travel time and/or mode of transportation between distinct anchors is referred to as a "chronotope." This chronotope may be stored in the chronotope database as an additional data point for future searches. Embodiments of the invention of the present disclosure are explained more fully with reference to FIGS. 1-6.

FIG. 1 illustrates a system 100 for determining location information and providing services based on that information, according to an example embodiment of the present disclosure. System 100 may include mobile device 110, network 120, remote computer 130, directory server 140, and remote computer 150. Mobile device 110 may include central processing unit (CPU) 111, memory 112, network interface 113, radio receiver 114, bar code reader 115, camera 116, microphone 117, user interface 118, and mobile application 119. Remote computer 130 may include CPU 131, memory 132, database 133, and remote application 134. Directory server 140 may include CPU 131, memory 132, directory 141, and database 142. Remote computer 150 may include remote service 151 and remote service database 152.

System 100 illustrates components useful for implementing a range-centric contextual information system. System 100 may include at least one mobile device 110 connected via network 120 to at least one remote computer 130. Network connectivity via network 120 may be continuous or intermittent. System 100 may be a closed system wherein the mobile devices 110 and remote computers 130 may be operated by a single organization or company. Alternatively, system 100 may be a publicly available service where mobile devices 110 are individually owned and each accesses the at least one remote computer 130.

Mobile device 110 provides a platform for determining a user's location, communicating with remote computer 130, and allowing the user to interact with location-based services. Mobile device 110 may be, for example, a mobile phone, personal digital assistant (PDA), smart phone, netbook, laptop computer, dedicated device, or digital camera. In some embodiments, mobile device 110 is continuously and automatically performing the presently disclosed methods. In other embodiments, the user manually activates one or more of the presently disclosed methods, e.g., by launching mobile application 119. Mobile device 110 may include a number of components as integral components or as peripheral components. These components are identified and described as follows.

Central processing unit (CPU) 111 enables the execution of local software and the interaction of various other components. CPU 111 may be one or more microprocessors or microcontrollers capable of executing programmed software instructions. CPU 111 may be, for example, an ARM-based processor, a MIPS-based processor, or an X86 compatible processor. CPU 111 may be a low-power, embedded processor or microcontroller.

Memory 112 stores software instructions and data for use by CPU 111 and/or other components of mobile device 110. Memory 112 may be one or more of the following types of tangible computer-readable media, e.g., RAM, ROM, EPROM, flash memory, magnetic storage, or optical storage. Memory 112 may also include a combination of memory types. Memory 112 may be volatile, non-volatile, or include both volatile and non-volatile technologies.

Network interface 113 provides connectivity, via network 120, to remote computer 130. Network interface 113 may be, for example, Ethernet, WiFi, WiMax, GSM, CDPD, Bluetooth, wireless USB, short message service, or a two-way pager. Network interface 113 may be a wired or wireless connection and may be continuously available or intermittent.

Radio receiver 114 provides reception of data from a radio frequency transmitter in order to capture a transmitter identifier for that transmitter, which may provide location identifying information. Radio receiver 114 may be, for example, a cell phone interface, an RFID reader, or any of the wireless networking technologies listed with reference to network interface 113. Further, radio receiver 114 may not be necessary if network interface 113 supports one or more wireless protocols and can provide this information to mobile device 110. In some embodiments, radio receiver 114 may receive and identify another mobile device within radio transmission range, e.g., another user's cell phone SIM information.

Bar code reader 115 allows mobile device 110 to read one and/or two-dimensional barcodes, which may provide location identifying information. Bar code reader 115 may include a scanning light source and receiver. Bar code reader 115 may read location identifying information directly from the bar code, e.g., if a museum includes a barcode encoding "Museum of Fine Art, South Entrance" or "Dinosaur Exhibit." In some embodiments, the information read from the barcode may be used by mobile device 110 to look up additional identifying information from a database (e.g., database 133 or an external database). For example, an arborist may have affixed a barcode to a historic or prominent tree with a numeric identifier. This identifier may identify the location, but additional information may be available on the arborist's website which may include a plain language description or name for the tree, e.g., "Treaty Oak" or "Bald Cypress on North lawn of the Capital."

Camera 116 allows mobile device 110 to capture still images or video at the user's location, which may provide location identifying information. Camera 116 may be an integral camera element, e.g., embedded in a camera phone or smart phone, or may be a peripheral device connected to mobile device 110. Camera 116 may have sufficient resolution, image quality, and light sensitivity to allow identification of location identifying characteristics of the subject of the photograph. For example, in some embodiments, camera 116 may be a low resolution, black and white camera, designed to read letters, numbers, bar code labels, and Braille. In these embodiments, camera 116 provides an easy mechanism for data entry (rather than having the user key in the information) especially where the user cannot read the printed language sufficiently well to be able to key in the information (e.g., a Westerner attempting to identify a sign written in Sanskrit, Greek, or Kanji). In other embodiments, camera 116 may be a high-resolution, color camera, capable of taking a clear picture of a building or natural formation. The captured image may be sufficiently detailed and clear to allow image recognition to identify the subject of the photograph in order to identify the user's location. Camera 116 may provide further information such as the field of view, depth of view or calculated range to subject for more accurately determining the user's location.

Microphone 117 allows mobile device 110 to capture audio from the user's location, which may provide location identifying information. Microphone 117 may be an integral element, e.g., the microphone in a mobile phone handset, or a peripheral device connected to mobile device 110. Microphone 117 may capture monaural or stereophonic sound. In some embodiments, microphone 117 may be combined with a speech recognition unit to recognize announcements made in mass transit vehicles, government buildings, and museums. Thus microphone 117 may capture an announcement of "Palais Royal" or "Aldwych" that may be interpreted by CPU 111 to identify a train station in Paris or London, respectively. In some embodiments, microphone 117 may record background or ambient sounds to attempt to match characteristic sounds to known locations. For example, a bell on an old church may have a distinctive ring, or the sound of elevated trains at one intersection in Chicago may have a distinctive screech.

User interface 118 allows the user to interact with mobile device 110, especially to confirm the identity of a location, to select one or more anchors, or to enter a descriptive name of a place. User interface 118 may be a standard mobile phone interface with a small liquid crystal display (LCD) and a set of buttons. User interface 118 may incorporate a touch screen over an LCD. User interface 118 may rely on a speaker and microphone, especially where a compact size is critical or where a user may not have sufficiently good eyesight to read an LCD or sufficiently good dexterity to type characters into the mobile device. In some embodiments, the user interface may identify a location but the identity is not in a human friendly format. For example, mobile device 110 may use camera 116 to identify a statue such that another mobile device 110 taking a picture from nearly the same place will match the same internal identifier. However, user interface 118 may prompt the user to enter (e.g., by typing text characters or speaking) a human friendly name such as "Venus Di Milo." In some embodiments, user interface 118 may prompt the user to enter a name in the user's native language if only foreign language names have been previously entered by other users.

Mobile application 119 enables the location identification of mobile device 110 and generates an anchor (described more fully in reference to FIG. 4 below) from at least the identified location. Mobile application 119 may be, for example, an operating system extension, a browser plug-in, application software, firmware, object code, or a script. In some embodiments, mobile application 119 may be programmed to identify a location-identifying physical characteristic (LIPC). In some embodiments, a single LIPC may be available to mobile device 110. In other embodiments, multiple LIPCs may be available. In some of those embodiments, mobile application 119 may be programmed to poll each available source of LIPC in priority order seeking a single, optimal LIPC. In other embodiments, mobile application 119 may be programmed to identify all available LIPCs, or all available LIPCs satisfying some criteria. For example, if the LIPC source is radio receiver 114, mobile application 119 may reject an LIPC with a radio signal strength below a predetermined minimum threshold.

Network 120 enables bi-directional communication between mobile device 110 and remote computer 130. Network 120 may be, for example, a GSM network, a cellular network with CDPD service, a WiFi or WiMax internet connection, or a two-way pager network. Network 120 may be a public network or a private network. Network 120 may be a peer-to-peer connection or an ad-hoc network.

Remote computer 130 provides an aggregation of anchor data for access by one or more mobile devices 110. Remote computer 130 may also allow additional remote computers or remote services to query anchor database 133. Remote computer 130 may be, for example, a personal computer, a server, a virtual computer in a cloud computing environment, or multiple computers of any type. Remote computer 130 may be running an operating system capable of supporting server software such as a web server or other IP based services.

Central processing unit (CPU) 131 enables the execution of local software and the interaction of various other components. CPU 131 may be one or more microprocessors or microcontrollers capable of executing programmed software instructions. CPU 131 may be, for example, an ARM-based processor, a MIPS-based processor, an X86 compatible processor, or a RISC processor. CPU 131 may be a high performance model of a processor family to handle simultaneous communications with many mobile devices 110.

Memory 132 stores software instructions and data for use by CPU 131 and/or other components of mobile device 110. Memory 132 may be one or more of the following types of tangible computer media, e.g., RAM, ROM, EPROM, flash memory, magnetic storage, or optical storage. Memory 132 may also include a combination of memory types. Memory 132 may be volatile, non-volatile, or include both volatile and non-volatile technologies.

Database 133 stores an aggregation of anchor data for access by one or more mobile devices 110, additional remote computers or additional remote services. Database 133 may be, for example, a commercial database, a flat file, or a data-structure stored in RAM. In some embodiments, long-term persistence may be a critical requirement, for example, where a large, continuously growing database is desired. In one such example, a new wireless network infrastructure is being installed, thus much of the system activity will be focused on adding new anchors to the system as infrastructure components are brought online. In some embodiments, short-term storage will suffice, for example, where transient movements or behaviors are being analyzed. In one such example, a service may be marketed as a crowd monitor to help people find or avoid large gatherings, thus deemphasizing old or stale data.

Remote application 134 enables the aggregation of anchors generated by one or more mobile devices 110 and retrieval by additional remote computers or remote services. Remote application 134 may be, for example, a web server, a service providing a connection-based protocol, or a service providing a light-weight, transaction-based protocol. Remote application 134 may perform a data aggregation function by accepting an anchor generated at mobile device 110 and transmitted to remote computer 130 via network 120. In some embodiments, when remote application 134 receives an anchor from mobile device 110, remote application 134 creates a new record in the database based at least in part on the received anchor data. Further processing of the new record may be unnecessary unless and until a subsequent database query retrieves that record.

In some embodiments, remote application 134 will process an incoming anchor received from mobile device 110 as follows. Remote application 134 will query database 133 for a matching anchor record, e.g., one which is associated with the same LIPC and therefore represents the same physical and/or logical location. If a matching anchor record is not found, a new anchor record may be created in database 133 based at least in part on the received anchor. Otherwise, the matching record in database 133 may be updated and/or augmented with information from the received anchor. In some embodiments, the matching record in database 133 is augmented with a user identifier and/or a timestamp indicating when the user was recorded to be at that location by mobile device 110. In some embodiments, remote application 134 may, upon receipt of an anchor from a mobile device 110, store anchor information in database 133 along with chronotope information, which is described more fully in reference to FIG. 4.

In addition to aggregation of anchor and/or chronotope information, remote application 134 may also receive and process queries submitted by mobile devices 110, or additional remote computers or additional services, via network 120. In some embodiments, a user may submit a query by interacting with user interface 118 as follows. A user selects one or more anchors in her vicinity, which may have been previously determined by mobile application 119 based on one or more LIPCs, and requests the remote computer to activate a remote service. In some embodiments, mobile application 119 may have communicated with remote application 134 to retrieve a user-friendly location description from database 133. If a user-friendly location description was retrieved, mobile application 119 may simply present this description to the user for approval or objection. After user selection of one or more anchors, a query may also be entered with one or more query parameters, e.g., "nearby pizza restaurants" or "least visited clothing stores." Mobile application 119 may then transmit the list of anchors jointly with the one or more query parameters to remote application 134 via network 120. Remote application 134 receives the query and searches for related remote services 151, e.g., "pizza restaurants directory," in database 133 based on the query parameters and the location of mobile device 110, represented as an anchor.

The query activates a service, e.g., "pizza restaurants directory," automatically or upon user selection. wherein the user sends a new query based at least on the previous query parameters and the location of mobile device 110 to listed services within database 133, via network 120, and sent to mobile application 119 after successful answer from queried services for UI 118. "Pizza restaurants directory" then queries database 133 to calculate nearby "pizza restaurant" from a list of sent anchors related to "pizza restaurants". Database 133 sends nearby "pizza restaurant" to "pizza restaurants directory" and, afterwards, "pizza restaurants directory" transmits the search results to mobile application 119 via network 120.

Remote application 134 may support one or more types of queries. Before describing these queries, some defined terms may be useful. The current anchor (CA) is defined as an anchor representing and/or associated with the current location of a mobile device 110. The previous anchor (PA) is defined as an anchor representing and/or associated with the last (i.e., most recent) identified location of the same mobile device 110. Thus, if a particular mobile device 110 has been associated, in chronological order, with anchors A1, A2, and A3, anchor A2 is the PA and anchor A3 is the CA.

There may or may not be a limit on the types of queries relevant to location-based services. The present disclosure describes embodiments with a non-limiting set of query types. In one scenario, a user may be hungry for pizza and may want to find a nearby pizza restaurant. In some embodiments, the user may submit a query, e.g., "nearby pizza restaurants," that is transmitted by mobile application 119 to remote application 134 for processing. In some embodiments, remote application 134 consults a remote service 151, e.g., "pizza restaurants directory," to receive a list of pizza restaurants for correlation with anchors in database 133. (Remote service 151 is described more fully below.) In some embodiments, remote application 134 relies on the user-friendly names and/or user-generated content to identify pizza restaurants.

Remote application 134 may translate this query into a query suitable for database 133. This query may be decomposed into two queries:
1) find a set of anchors linked to CA by one or more chronotopes wherein each of the set of anchors also corresponds to a location in the list of pizza restaurants (or has "pizza restaurant" in the user-friendly name, if no list is available); and
2) sort the set of anchors by the total distance between each candidate anchor and CA where the total distance is the sum of the distances represented by the one or more chronotopes linking CA with each candidate anchor.

For example, suppose CA is a particular downtown theater. On a prior occasion, one user traveled from CA to a coffee shop in five minutes and then traveled from that coffee shop to Little Italy Pizza in three minutes. On another prior occasion, a second user traveled from CA directly to Leaning Tower Pizza in ten minutes. On yet another prior occasion, the second user traveled from CA to a Joe's Pizza in a town with intermediate stops at a drive-through coffee shop and a gas station with a cumulative travel time of fifty-five minutes. As a result of the query for "nearby pizza restaurants," remote application 134 might transmit to mobile application 119 the list of "Little Italy Pizza" and "Leaning Tower Pizza," in that order, with the series of chronotope between CA and Joe's Pizza omitted from the search result as too distant. Remote application 134 may transmit additional information as well including, for example, the route taken and transit times for each leg of the route (represented by chronotopes). Resulting information is received by the remote service 151 (e.g., "pizza restaurants directory") and sent to mobile application 119.

In another scenario, a user may wish to find a unique shirt to wear to a party. In some embodiments, the user may enter a query, via user interface 118, represented by the phrase: "least visited clothing stores." Remote application 134 receives the query and searches for related remote services 151, e.g. "clothes stores directory," in directory 141 based on the query parameters and the location of mobile device 110, represented as an anchor. In some embodiments, the query activates a remote service 151, e.g. "clothes stores directory," automatically. In some embodiments, a list of available remote services 151 is sent to mobile application 119 and is communicated to the user via UI 118 for manual selection. Once activated, remote service 151 then queries remote application 134 for the least visited of a set of identified clothing stores, each of which is represented by one or more anchors. Remote application 134 receives this query as described above and decomposes the query into: 1) find anchors representing matching sent anchors, and 2) sort the resulting set of anchors by the number of chronotopes connecting each to another anchor.

Directory server 140 provides a directory of services available to mobile device 110 or remote computer 130. Directory server 140 may be, for example, a personal computer, a server, a virtual computer in a cloud computing environment, or multiple computers of any type. Directory server 140 may be running an operating system capable of supporting server software such as a web server or other IP based services. Directory server 140 may include CPU 131, memory 132, directory 141, and database 142. Directory 141 stores information about services e.g., remote service 151, which is described below. This information may include an identifier, a name, a description, descriptive tags, classifiers, and/or real-time or near real-time status information. Directory 141 provides a query capability for identifying and locating services based, for example, on the user's present interest. Directory 141 may be an implementation of the lightweight directory access protocol (LDAP), domain name service (DNS), or a similar technology. Database 142 provides underlying storage for this directory information.

Remote computer 150 provides remote service 151, which may have relevant data in remote service database 152. Remote computer 150 may be configured according to the description of remote computer 130, above, but need not be identically configured. Remote service 151 provides a service or capability accessible by mobile device 110. For example, remote service 151 may provide a directory of clothing stores or pizza restaurants. In another example, remote service 151 may provide information about local tourist attractions. Remote service 151 may require or benefit from access to database 133. Mobile device 110 may access remote service 151 directly (via network 120) or may first access directory 141 to identify and locate remote service 151.

In one example embodiment, a user query for nearby pizza restaurants may be sent from mobile application 119 to remote application 134. Remote application 134 may forward the query, in whole or in part, to directory 141 and request an applicable remote service 151. Remote service 151, e.g., "pizza restaurants directory," may then execute the query against database 133 in conjunction with a list of pizza restaurants in remote service database 152.

The illustration of remote computer 130, directory server 140, and remote computer 150 as separate computers coupled via network 120, however these functions could all be performed on the same computer or could be distributed in alternative arrangements.

Figure 2:
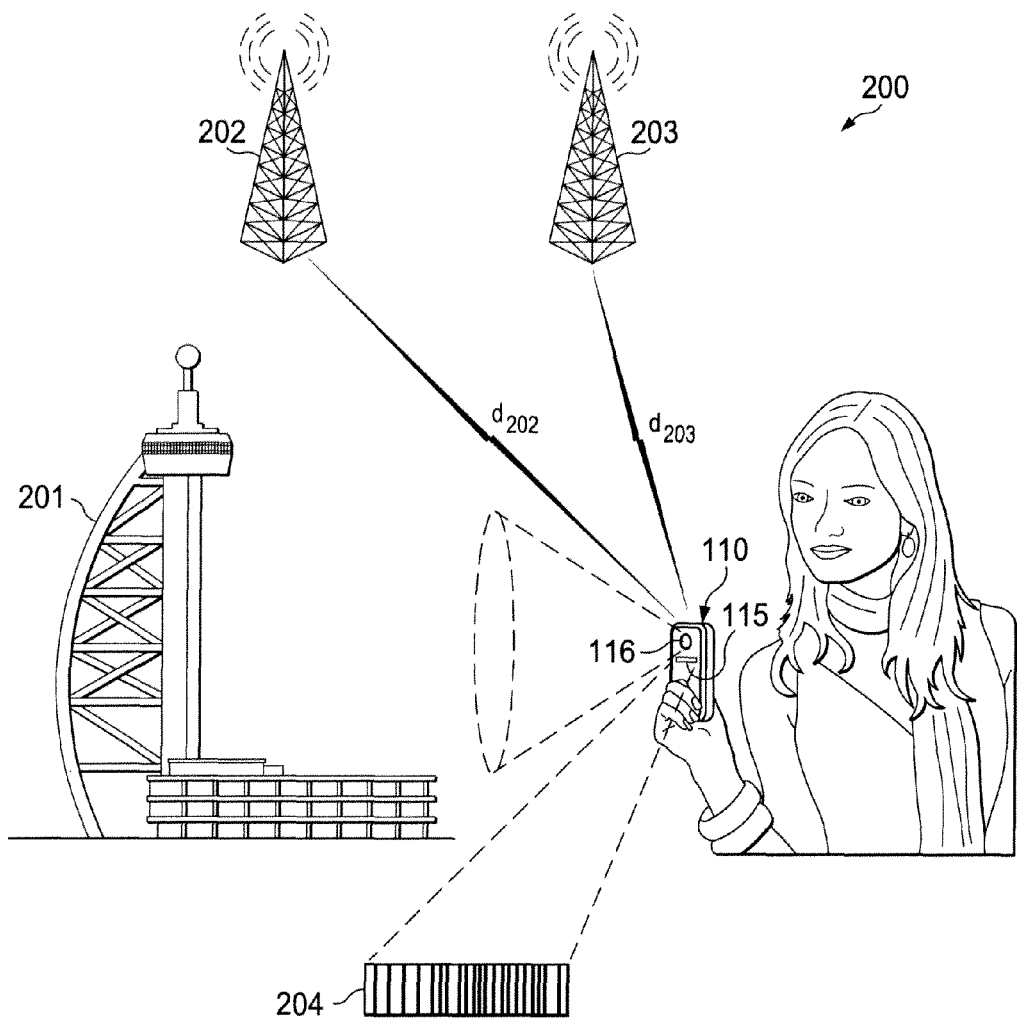
FIG. 2 illustrates a view of a mobile device for determining location information, according to an example embodiment of the present disclosure.

FIG. 2 illustrates a view of a mobile device for determining location information, according to an example embodiment of the present disclosure. View 200 illustrates a user at a particular location holding mobile device 110. Mobile device 110 is within radio reception of radio transmitters 202 and 203 located distances $d_{202}$ and $d_{203}$ away from mobile device 110, respectively. Camera 116 may be capable of capturing an image of landmark 201. Further, barcode reader 115 may be capable of reading bar code 204, which may be affixed to a sign or other object in the scene.

In some embodiments, mobile device 110 includes camera 116, which may be used to capture an image and/or video of landmark 201. In some embodiments, mobile application 119 may incorporate image recognition software capable of identifying features of the subject of a photograph and capable of generating a representative code that can be matched against a previously generated representative code. In other embodiments, mobile application 119 may transmit captured image and/or video data to remote computer 130 where remote application 134 may perform the image recognition function. In these embodiments, the representative code may be used as an LIPC or may be used to lookup or generate an LIPC.

In some embodiments, mobile device 110 includes bar code reader 115, which may be used to read bar code 204 affixed to a sign or object in the scene. Bar code 204 may have been affixed to the sign or object for the purpose of identifying the location, or this use may be incidental to the original purpose of the bar code. For example, bar code 204 may be affixed to an ATM machine in a store and may represent the serial number of the ATM. Mobile application 119 may use the serial number as an LIPC to uniquely identify the store or an area within the store that is in close proximity to the ATM, at least as long as the ATM remains in place.

In some embodiments, mobile device 110 includes radio receiver 114. In view 200, mobile device 110 is within radio reception range of transmitters 202 and 203 located distances $d_{202}$ and $d_{203}$ away from mobile device 110, respectively. Transmitters 202 and 203 may be any type of radio transmitter in proximity to mobile device 110 and may broadcast a unique transmitter identifier. Distances $d_{202}$ and $d_{203}$ may be used to determine which transmitter may be the best proxy for physical distance. Mobile application 119 may compare the relative distances to choose the transmitter identifier of the transmitter (e.g., 202, 203) closest to mobile device 110 as the LIPC. Distances $d_{202}$ and $d_{203}$ may be proxies for or rough estimates of physical distances. In some situation, where transmitters 202 and 203 are of the same basic technology, mobile application 119 may simply compare the raw signal strength and use the transmitter identifier of the transmitter with the stronger signal as it may be closer.

In some situations, especially where transmitters 202 and 203 are of different basic technologies, mobile application 119 may compare the strength of a signal from transmitters 202 and 203, for example, against a range of possible signal strengths determined, at least in part, on the transmission technology. The results of this comparison may be used to normalize the signal strengths for a more useful comparison of $d_{202}$ and $d_{203}$. An example process for normalization is as follows. Suppose transmitter 202 is a WiFi router with a known effective range of roughly 300 feet, mobile application 119 may calculate an estimated, though likely inaccurate, distance $d_{202}$ in feet based on a sensed signal strength compared to a minimum and maximum possible signal strength (determined mathematically or through field testing) and an inverse quadratic relationship between distance and signal strength. If transmitter 203 is a GSM tower in a hilly region, the GSM tower range may be a mile and a half. This information, combined with some sampled data or mathematical models, may be used by mobile application 119 to estimate a normalized $d_{203}$.

In some embodiments, mobile application 119 may first sort the available wireless signals by range, from shortest range to longest range, and select the strongest signal available from the shortest range transmitters within effective transmission range of mobile device 110. This may provide the most localized LIPC. Further, such an embodiment would be able to use longer range transmitters, e.g., FM broadcast transmitters or GSM satellite transmitters, where no other LIPCs are available. Users in certain areas, including those on ships at sea or travelling across stretches of sparsely populated countryside, may benefit from this approach.

Figure 3:
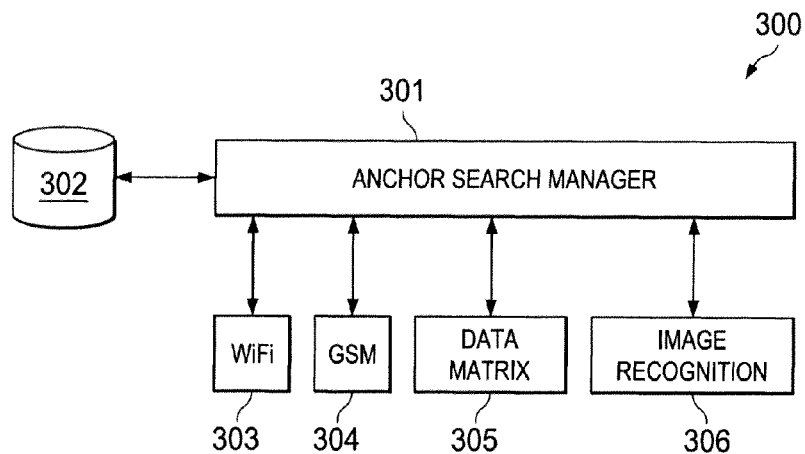
FIG. 3 illustrates a system for determining location information, according to an example embodiment of the present disclosure.

FIG. 3 illustrates a system for determining location information, according to an example embodiment of the present disclosure. System 300 for determining location information may include anchor search manager 301, anchor database 302, and one or more LIPC identification modules including WiFi search 303, GSM search 304, data matrix scan 305, and image recognition module 306.

System 300 illustrates components for identifying one or more anchors that identify the current location of mobile device 110. In some embodiments, some or all of the components illustrated in system 300 may be incorporated into mobile device 110. In other embodiments, some of the components illustrated in system 300 may be incorporated into remote computer 130. For example, anchor database 302 may be incorporated into mobile device 110 in some embodiments, into remote computer 130 in other embodiments, and into each of mobile device 110 and remote computer 130 in other embodiments. The logical arrangement of the various modules is for illustration purposes only. One of ordinary skill in the art would understand that functionally may be completely integrated or modularized in a variety of different ways without deviating from the goals of the present disclosure.

Anchor search manager 301 is a processing module (comprising hardware, software, and/or firmware) capable of querying the one or more LIPC identification modules. Anchor search manager 301 may also be capable of querying anchor database 302 based on one or more LIPCs identified by the one or more LIPC identification modules. Anchor search manager 301 may identify one or more anchors identifying the present location of mobile device 110. Some approaches used in identifying anchors are described above with reference to FIG. 2. In some embodiments, anchor search manager 301 may query anchor database 302 for previously stored prioritization information. For example, more permanent LIPCs—e.g., those embodied in physical manifestations, associated with fixed locations, or provided by a governmental agency—may be preferred over potentially transient ones. Thus, a barcode embodied in an official signpost may be marked in anchor database 302 as an official LIPC and may be given more priority in the event that multiple LIPCs are available to mobile device 110.

Anchor database 302 is a database capable of storing multiple records relating to multiple anchors. Anchor database 302 may be, for example, a commercial database, a flat file, or a data-structure stored in RAM. In some embodiments, long-term persistence may be a critical requirement. Anchor database 302 may be a cache, subset, or complete replica of database 133. Anchor database 302 may reside in memory 112 on mobile device 110. Anchor database may be capable of enabling the operation (in whole or in part) of the present system and methods during periods of time when mobile device 110 is unable to connect to remote computer 130.

WiFi search 303 is a processing module capable of identifying one or more WiFi base stations within radio range of mobile device 110. Mobile device 110 need not have access rights to send or receive data via the one or more WiFi base stations. This identification may be based, at least in part, on a medium access control (MAC) address, a broadcast base station name, a broadcast public encryption key unique to a base station, or any other LIPC. WiFi search 303 may report to anchor search manager 301 the identities of several available WiFi base stations, or may apply a filtering or prioritization algorithm as described above with reference to anchor search manager 301 and to FIG. 2. While this module has been described as specific to WiFi technologies, one of ordinary skill in the art would understand that this module may be implemented to work with alternative or additional wireless networking or identification (e.g., RFID) technologies.

GSM search 304 is a processing module capable of identifying one or more GSM towers. Mobile device 110 need not have access rights to send or receive data via the one or more GSM towers. This identification may be based, at least in part, on a GSM tower identifier, a broadcast tower name, or any other LIPC. GSM search 304 may report to anchor search manager 301 the identities of several available GSM towers, or may apply a filtering or prioritization algorithm as described above with reference to anchor search manager 301 and to FIG. 2. While this module has been described as specific to GSM, one of ordinary skill in the art would understand that this module may be implemented to work with alternative or additional wireless telecommunication technologies.

Data matrix scan 305 is a processing module capable of reading one or more bar codes visible from mobile device 110. Data matrix scan 305 may process information received from bar code reader 115 or camera 116. An LIPC generated by data matrix scan 305 may be the entire contents of a scanned bar code, a subset of that information, or a representative value derived, at least in part, from the contents of the scanned bar code. Data matrix scan 305 may report to anchor search manager 301 all available LIPCs, or may apply an filtering or prioritization algorithm as described above with reference to anchor search manager 301 and to FIG. 2.

Image recognition module 306 is a processing module capable of identifying a subject of an image captured by camera 116, that identity represented as an LIPC. Image recognition module 306 may identify, for example, structures, natural geographical features, people, signs, or artwork. Image recognition module 306 may report to anchor search manager 301, all available LIPCs, or may apply an filtering or prioritization algorithm as described above with reference to anchor search manager 301 and to FIG. 2

Figure 4:
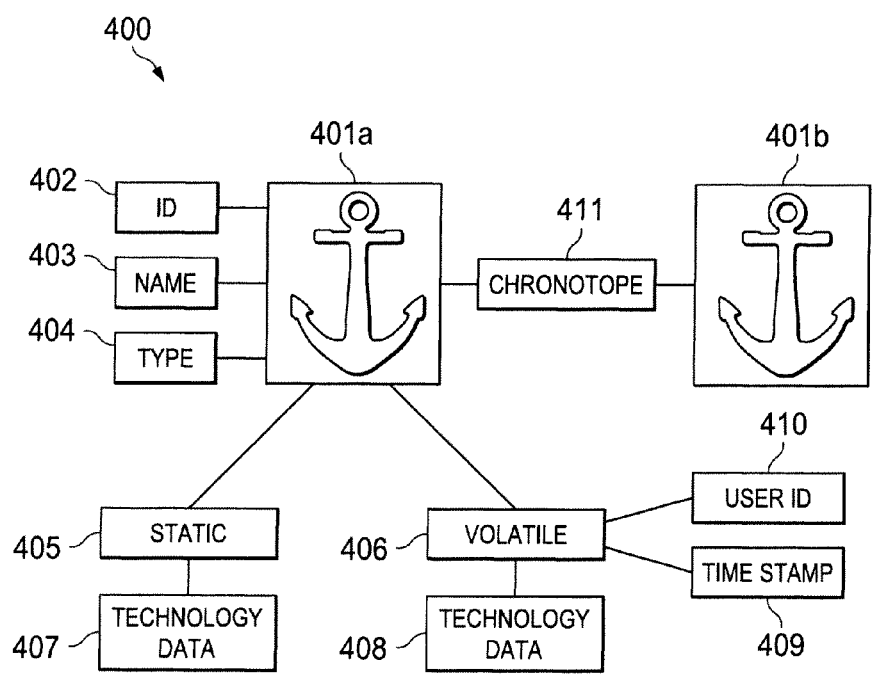
FIG. 4 illustrates a data structure (e.g., data relationships) representing various data stored and/or processed by an example embodiment of the present disclosure.

FIG. 4 illustrates a data structure (e.g., data relationships) representing various data stored and/or processed by an example embodiment of the present disclosure. Data structure 400 includes anchors 401a and 401b, ID 402, name 403, type 404, static data 405, technology data 407, volatile data 406, technology data 408, time stamp 409, user id 410, and chronotope 411.

Data structure 400 illustrates an example organization of data relevant to the present disclosure. Data structure 400 may be implemented in whole or in part by various embodiments of the present disclosure. Data structure 400 may be implemented as one or more objects, data values, and/or database records. Data structure 400 may be stored in database 133, anchor database 302, memory 112, and/or memory 134. Data structure 400 may capture a representation of a location in geometric, symbolic, time-based, and/or semantic terms.

Anchors 401a and 401b each represent a location of a mobile device 110. Anchor 401a represents a physical location, but may not be as precise and/or accurate as a triangulated location, e.g., GPS coordinates. In some embodiments, anchor 401a may be associated with a variety of data elements, each of which is described individually below. Anchor 401b may be associated with the same or different data elements and is illustrated to show context for chronotope 411.

ID 402 is a unique identifier that may be automatically assigned by mobile device 110 or remote computer 130. ID 402 may or may not be in a format readable by the user.

Name 403 is a plain language or human-readable name that may be displayed to the user, e.g., in a list of possible destination locations. Name 403 may be initially entered by the user or may be retrieved from another source. When a new anchor is generated, e.g., when a user visits a location with mobile device 110 before any other user has done so, mobile application 119 may prompt the user for a human-readable name. This name may be pre-populated with, for example, the WiFi base station ID to be edited or replaced by the user with a more user-friendly name.

Type 404 indicates a technology type, e.g., one that can be used to estimate operational ranges. In some embodiments, type is automatically populated based on the technology used to generate the LIPC associated with anchor 401a.

Static data 405 is a collection of one or more data elements representing static, or relatively static, information about the anchor. Static data may include, for example, technology data 407.

Technology data 407 is a value or set of values capturing the LIPC. For example, technology data 407 may be a GSM tower identifier, a bar code value, a WiFi base station MAC address. Technology data 407 may include a technology-specific range, e.g., a distance from the source of the LIPC to the most distant point where connectivity is possible.

Volatile data 406 is a collection of one or more data elements representing dynamic information relating to anchor 401a. Volatile data 406 may capture information from more than one user, e.g., captured when each user with a mobile device 110 was registered at the location represented by anchor 401a.

Technology data 408 is a value or set of values capturing the LIPC. For example, technology data 407 may be a GSM signal strength, a bar code error value, a WiFi base station RSSI. Technology data 408 differs from technology data 407 in that it is transient. For example, suppose a parking lot is identified by anchor 401a, which is associated with GSM tower ID 44129. While strolling in the vicinity of GSM tower ID 44129 the GSM signal strength will vary based on line-of-site obstructions, distance from the GSM tower, and other factors. Further, suppose that in instant A signal strength was −58 dBm and in instant B signal strength was −71 dBm. Anchor 401a may be associated with technology data 407 set to, e.g., GSM-44129, and may be associated with technology data 408 set to, e.g., −58 dBm. In other embodiments, anchor 401a may be associated with GSM tower 44129 while a different anchor may be associated with −71 dBm.

Time stamp 409 may capture time information along with volatile data 406. Time stamp 409 may, for example, be used to capture the popularity of a location represented by anchor 401a at a given time. User ID 410 may capture user identifying information along with volatile data 406. This may allow system 100 to track a user over time. User ID 410 may, alternatively, be a mobile device identifier.

Chronotope 411 is an association between two anchors, e.g., anchors 401a and 401b. Chronotope 411 may indicate a path taken by a user and may associate various data with that path. For example, chronotope 411 may indicate a mode of transit (e.g., a pedestrian mode, an airplane mode, a bicycle mode, a boat mode, a mass transit mode, and an automobile mode) and may indicate a transit time. In some embodiments, transit time may be calculated by comparing a time stamp 409 associated with anchor 401a with another time stamp 409 associated with anchor 401b. However, in some embodiments, time stamp 409 is only associated with anchor 401a upon arrival, in which case the previous calculation would erroneously include the time the user spent at the location represented by anchor 401a. In certain of these embodiments, chronotope 411 measures the average an average temporal distance between anchor 401a and anchor 401b determined from a plurality of transits recorded in database 133. Chronotope 411 may represent a single transit, wherein an additional chronotope 411 is stored in database 133 each time a user travels from anchor 401a to anchor 401b. Alternatively, chronotope 411 may represent the collection of transits from anchor 401a to anchor 401b.

Figure 5:
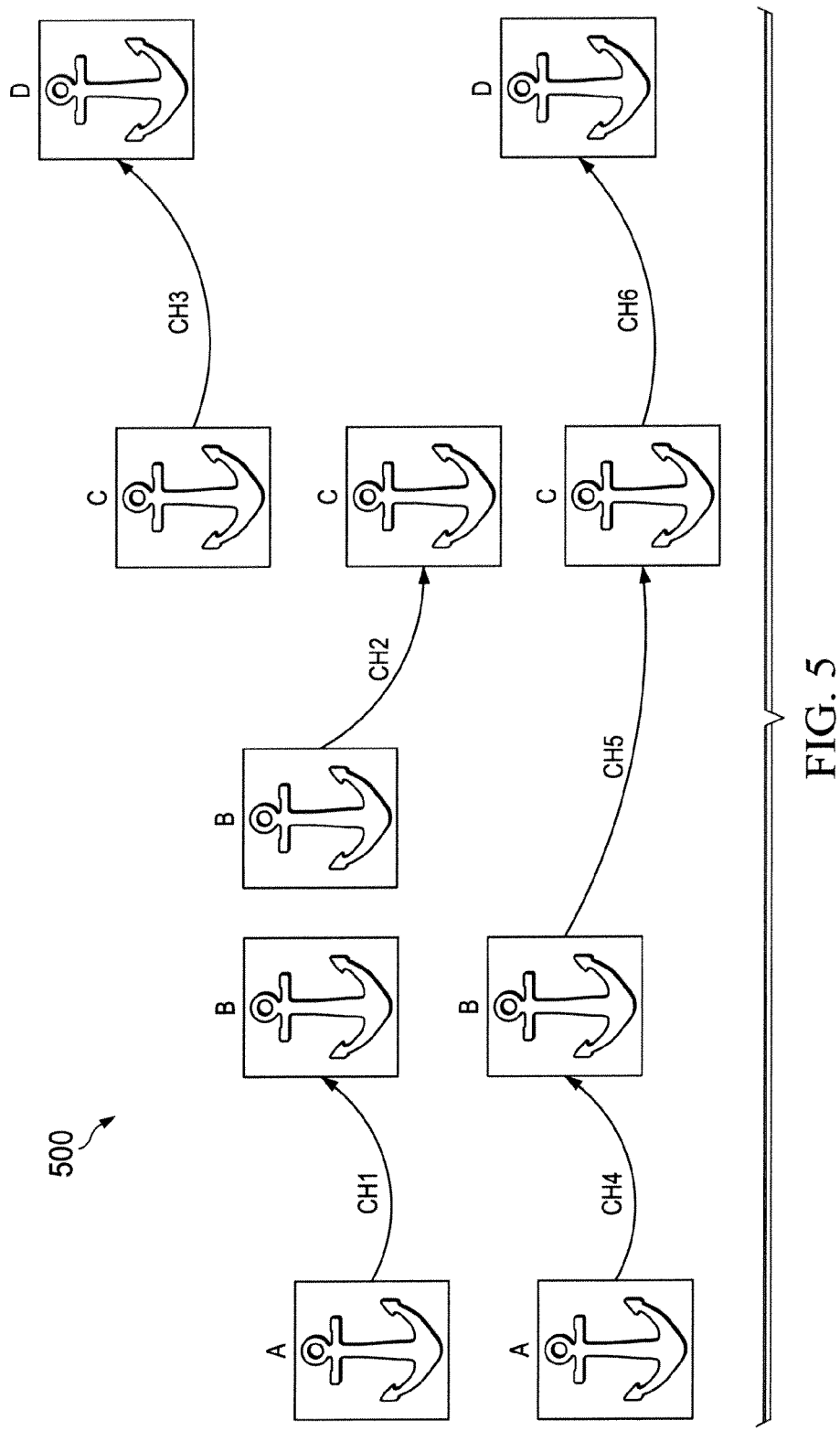
FIG. 5 illustrates a number of chronotopes representing transits between four locations, according to certain embodiments of the present disclosure.

FIG. 5 illustrates a number of chronotopes representing transits between four locations, according to certain embodiments of the present disclosure. Data set 500 includes four anchors, A-D, and six chronotopes, CH1-CH6. In data set 500, each connected string of anchors represents a single user (or mobile device) registered at each anchor with a transition between each. For example, chronotope CH1 represents a transition from A to B by a single user. In another example, a user (the same user at a different time or a different user) travels from A to B, represented by CH4, then from B to C, represented by CH5, then from C to D, represented by CH6. Accordingly, CH2 represents a user trip from B to C and CH3 represents a user trip from C to D.

Remote application 134 may calculate the distance between any two anchors in a number of ways. In some embodiments, remote application 134 may calculate the distance between A and B as the minimum, maximum, or average transit time represented by CH1 and CH4, the chronotopes connecting A and B. In some embodiments, remote application 134 may calculate distance between B and C using metrics other than transit time. In certain embodiments, remote application 134 may measure the popularity of the transit from anchor B to anchor C. For example, remote application 134 may measure the ratio of a count of chronotopes in database 133 that are associated with both B and C and another count of chronotopes in database 133 associated with B but not C.

Figure 6:
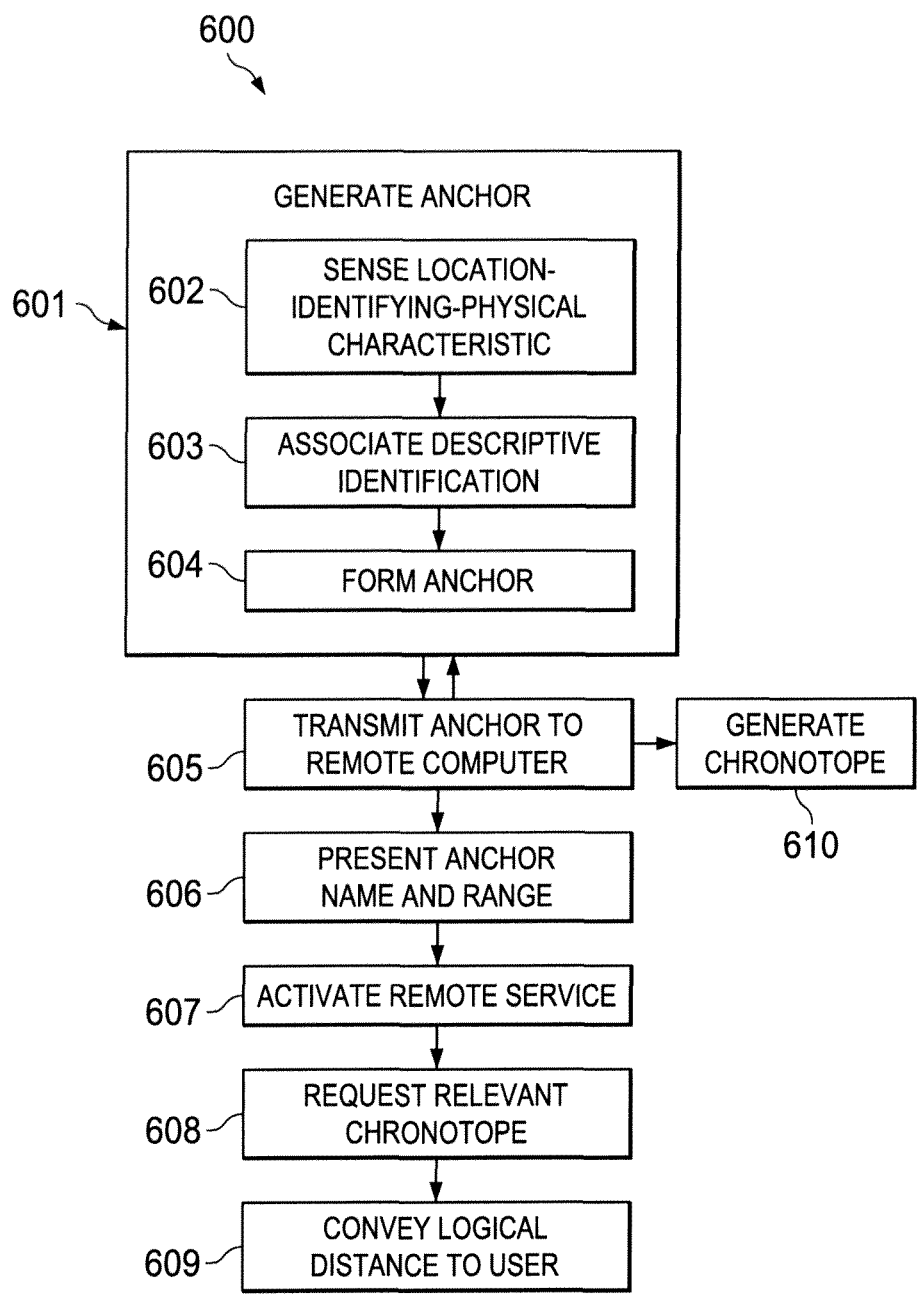
FIG. 6 illustrates a flowchart of an example method of the present disclosure, according to certain embodiments.

FIG. 6 illustrates a flowchart of an example method of the present disclosure, according to certain embodiments of the present disclosure. Method 600 includes steps of generate anchor 601—which includes steps of sense location-identifying physical characteristic 602, associate descriptive identification 603, and form anchor 604—transmit anchor to remote computer 605, present anchor name and range to a user 606; activate remote service 607, request relevant chronotope 608, and convey logical distance to user 609. Method 600 also includes a step of generate chronotope 610.

Method 600 may be performed by certain embodiments of the present disclosure. Method 600 may be illustrated as a user using mobile device 110 to identify her present location and to find suggestions, using remote computer 130, for her next destination.

Generate anchor 601 is a method for identifying the current location of mobile device 110. In some embodiments, mobile application 119 performs the step of generate anchor 601. For example, mobile application 119 may cause mobile device, e.g., using radio receiver 114, to sense a location-identifying physical characteristic 602. Next, mobile application 119 may associate descriptive identification 603, e.g., by prompting the user to enter a user-friendly name. Alternatively, mobile application 119 may query memory 112 or database 133 (via network 120 and remote computer 130) to retrieve an existing user-friendly name that is associated with the present location of mobile device 110. If an existing user-friendly name is found, mobile device, via user interface 118, may prompt the user to verify and/or modify the found user-friendly name. Once the LIPC, and user-friendly name are present, mobile application 119 may form anchor 604. Mobile application 119 may form anchor 604 by creating a new data structure, or by querying memory 112 or database 133 for an existing anchor data structure, and associating relevant data with that anchor data structure.

Transmit anchor to remote computer 605 provides location identifying information to remote computer 130. Mobile application 119 transmits the anchor data structure to remote computer 130. Remote application 134 receives the anchor data structure and adds it to database 133. Remote application 134 may, in certain embodiments, derive chronotope information from two successive transmissions of anchor information by the same mobile device 110. In other embodiments, mobile application 119 may generate chronotope information and transmit that information along with the anchor data structure to remote computer 130.

Present anchor name and range 606 provides the user with additional information about the user's current location. Mobile application 119 receives information from database 133 and displays, e.g., via user interface 118, a list of one or more anchors representing the user's present location. Each anchor may be displayed along with range information indicating, for example, the specificity of the anchor in identifying the user's present location. The user then selects one or more anchors from the list as best representing the user's present location. This selection from among multiple anchors allows the user to tailor search results.

Activate remote service 607 is the submission of a query for a recommended destination. Mobile application 119 may prompt the user, e.g., via user interface 118, to enter search criteria. Mobile application 119 then transmits, and remote application 134 receives, this search criteria. In some embodiments, remote application 134 may transmit the search criteria to remote service 151 and may also include information relating to CA. Remote service 151 may return a set of search results to remote application 134 for correlation with anchors in database 133. This modular design combined with the user's ability to select a current anchor provides a great deal of flexibility for the user.

Request relevant chronotope 608 provides a set of one or more chronotopes linking the current anchor with a proposed destination anchor. Remote application 134 queries database 133 for chronotopes associating the current anchor with a set of one or more destination anchors. The search criteria may limit the search results by specifying some aspect of the chronotope (e.g., distance or mode of transit) and/or some aspect of the destination anchor.

Convey logical distance to user 609 provides search results to the user. Remote application 134 transmits, and mobile application 119 receives, a set of destination anchors and associated distance information. Mobile application 119 displays, e.g., via user interface 112, this list of anchors and associated distance information.

Generate chronotope 610 provides a mechanism for building a database of anchors and chronotopes. Mobile device 110 generates a first anchor using the component steps of generate anchor 601. Mobile device 110 then transmits the first anchor to remote computer 130 at step 605. After mobile device 110 has been moved to a new location, mobile device 110 then generates a second anchor using the component steps of generate anchor 601. Mobile device transmits the second anchor to remote computer 130 at step 605. Each anchor transmission may include a timestamp, or a timestamp may be generated by remote computer 130 upon receipt. Remote application 134 receives the first and second anchor and generates a chronotope associating the two and associating a time difference between the two timestamps. This chronotope is stored in database 133 for later retrieval.

For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. A computer implemented method for providing location-based services using a mobile device, the method comprising:
    generating a first anchor by:
        sensing a first location-identifying physical characteristic proximate to a mobile device present at a first location and generating a representation of the first location-identifying physical characteristic;
        determining a descriptive identification of the first location; and
        combining the descriptive identification and the representation of the first location-identifying physical characteristic, wherein global positioning system information including geographic coordinate pair is not used in generation of the first anchor;
    transmitting the first anchor, comprising the representation of the first location-identifying physical characteristic, to a computer remote from the first location;
    requesting from the remote computer a chronotope retrieved from a database of previously generated anchors, the received chronotope indicating a logical distance between the first anchor and a second anchor, comprising a representation of a second location-identifying physical characteristic, wherein the second anchor is associated with a second location distinct and remote from the first location, wherein the database does not comprise an association between the first anchor and a geographic coordinate pair; and
    conveying to a user of the mobile device information including the logical distance between the first and second anchors indicated by the received chronotope.

2. The method of claim 1, wherein the first location identifying physical characteristic is selected from a group consisting of:
- an identifier of a single stationary wireless transmitter producing a transmission received by the mobile device;
- a one-dimensional barcode;
- a two-dimensional barcode;
- a plurality of identifying features of sound captured by the mobile device;
- a plurality of identifying features of an image captured by the mobile device; and
- a plurality of identifying features of a video stream captured by the mobile device.

3. The method of claim 2, further comprising:
- automatically collecting a wireless transmitter identifier and an associated radio type for each of a plurality of single stationary wireless transmitters in communication range of the mobile device;
- automatically determining the theoretical maximum communication range associated with each wireless transmitter identifier based at least in part on the radio type associated with the wireless transmitter identifier; and
- selecting as the first location identifying physical characteristic the wireless transmitter.

4. The method of claim 1, further including:
- requesting from the remote computer to retrieve from the database of previously generated anchors to retrieve a previously recorded descriptive identification of the first anchor;
- prompting the user to confirm that the previously recorded descriptive identification of the first anchor accurately describes the first location; and
- transmitting the first timestamp to the remote computer to be recorded in association with the first anchor.

5. The method of claim 1, wherein the logical distance between the first and second anchors is represented by one or more parameters selected from a group consisting of:
- a temporal distance indicated by the chronotope;
- an average temporal distance between the first anchor and the second anchor determined from a plurality of chronotopes in the database of previously generated anchors, each associated with both the first anchor and the second anchor; and
- a ratio of a first count of chronotopes in the database of previously generated anchors associated with both the first anchor and the second anchor and a second count of chronotopes in the database of previously generated anchors associated with the first anchor but not the second anchor.

6. The method of claim 1, wherein the step of requesting from the remote computer the chronotope retrieved from a database of previously generated anchors further includes a limiting instruction requiring that the retrieved chronotope be limited to a chronotope indicating a mode selected from a group consisting of:
- a pedestrian mode;
- an airplane mode;
- a bicycle mode;
- a boat mode;
- a mass transit mode; and
- an automobile mode.

7. The method of claim 1, further comprising receiving an input from the user providing an identification of the first location.

8. Software embodied in non-transitory computer-readable media and, when executed by a processor, operable to:
- generate a first anchor by:
  - sensing a first location-identifying physical characteristic proximate to a mobile device present at a first location and generating a representation of the first location-identifying physical characteristic;
  - determining a descriptive identification of the first location; and
  - combining the descriptive identification and the representation of the first location-identifying physical characteristic, wherein global positioning system information including geographic coordinate pair is not used in generation of the first anchor;
- transmit the first anchor, comprising the representation of the first location-identifying physical characteristic, to a computer remote from the first location;
- request from the remote computer a chronotope retrieved from a database of previously generated anchors, the received chronotope indicating a logical distance between the first anchor and a second anchor, wherein the second anchor, comprising a representation of a second location-identifying physical characteristic, is associated with a second location distinct and remote from the first location, wherein the database does not comprise an association between the first anchor and a geographic coordinate pair; and
- convey to a user of the mobile device information including the logical distance between the first and second anchors indicated by the received chronotope.

9. The software of claim 8, wherein the first location identifying physical characteristic is selected from a group consisting of:
- an identifier of a single stationary wireless transmitter producing a transmission received by the mobile device;
- a one-dimensional barcode;
- a two-dimensional barcode;
- a plurality of identifying features of sound captured by the mobile device;
- a plurality of identifying features of an image captured by the mobile device; and
- a plurality of identifying features of a video stream captured by the mobile device.

10. The software of claim 9, further operable to:
- automatically collect a wireless transmitter identifier and an associated radio type for each of a plurality of single stationary wireless transmitters in communication range of the mobile device;
- automatically determine the theoretical maximum communication range associated with each wireless transmitter identifier based at least in part on the radio type associated with the wireless transmitter identifier; and
- select as the first location identifying physical characteristic the wireless transmitter identifier.

11. The software of claim 8, further operable to:
- request from the remote computer to retrieve from the database of previously generated anchors to retrieve a previously recorded descriptive identification of the first anchor;
- prompt the user to confirm that the previously recorded descriptive identification of the first anchor accurately describes the first location; and
- transmit the first timestamp to the remote computer to be recorded in association with the first anchor.

12. The software of claim 8, wherein the logical distance between the first and second anchors is represented by one or more parameters selected from a group consisting of:
- a temporal distance indicated by the chronotope;
- an average temporal distance between the first anchor and the second anchor determined from a plurality of chronotopes in the database of previously generated anchors, each associated with both the first anchor and the second anchor; and a ratio of a first count of chronotopes in the database of previously generated anchors associated with both the first anchor and the second anchor and a second count of chronotopes in the database of previously generated anchors associated with the first anchor but not the second anchor.

13. The software of claim 8, further operable to receive an input from the user providing an identification of the first location.

14. A computing system comprising:
a processor;
a memory coupled to the processor; and
a mobile application operable to:
generate a first anchor by:
sensing a first location-identifying physical characteristic proximate to a mobile device present at a first location and generating a representation of the first location-identifying physical characteristic;
determining a descriptive identification of the first location; and
combining the descriptive identification and the representation of the first location-identifying physical characteristic, wherein global positioning system information including geographic coordinate pair is not used in generation of the first anchor;
transmit the first anchor, comprising the representation of the first location-identifying physical characteristic, to a computer remote from the first location;
request from the remote computer a chronotope retrieved from a database of previously generated chronotopes, the received chronotope indicating a logical distance between the first anchor and a second anchor, comprising a representation of a second location-identifying physical characteristic, wherein the second anchor is associated with a second location distinct and remote from the first location, wherein the database does not comprise an association between the first anchor and a geographic coordinate pair; and
convey to a user of the mobile device information including the logical distance between the first and second anchors indicated by the received chronotope.

15. The computing system of claim 14, wherein the first location identifying physical characteristic is selected from a group consisting of:
an identifier of a single stationary wireless transmitter producing a transmission received by the mobile device;
a one-dimensional barcode;
a two-dimensional barcode;
a plurality of identifying features of sound captured by the mobile device;
a plurality of identifying features of an image captured by the mobile device; and
a plurality of identifying features of a video stream captured by the mobile device.

16. The computing system of claim 14, wherein the mobile application is further operable to:
automatically collect a wireless transmitter identifier and an associated radio type for each of a plurality of single stationary wireless transmitters in communication range of the mobile device;
automatically determine the theoretical maximum communication range associated with each wireless transmitter identifier based at least in part on the radio type associated with the wireless transmitter identifier; and
select as the first location identifying physical characteristic the wireless transmitter identifier.

17. The computing system of claim 14, wherein the mobile application is further operable to:
request from the remote computer to retrieve from the database of previously generated anchors to retrieve a previously recorded descriptive identification of the first anchor;
prompt the user to confirm that the previously recorded descriptive identification of the first anchor accurately describes the first location; and
transmit the first timestamp to the remote computer to be recorded in association with the first anchor.

18. The computing system of claim 14, wherein the logical distance between the first and second anchors is represented by one or more parameters selected from a group consisting of:
a temporal distance indicated by the chronotope;
an average temporal distance between the first anchor and the second anchor determined from a plurality of chronotopes in the database of previously generated anchors, each associated with both the first anchor and the second anchor; and
a ratio of a first count of chronotopes in the database of previously generated anchors associated with both the first anchor and the second anchor and a second count of chronotopes in the database of previously generated anchors associated with the first anchor but not the second anchor.

19. A computer implemented method for providing location-based services using a mobile device, the method comprising:
receiving from a mobile device a first anchor including:
a representation of a first location-identifying physical characteristic proximate to a mobile device present at a first location,
a descriptive identification of the first location, and
a first timestamp, wherein global positioning system information including geographic coordinate pair is not used in generation of the first anchor;
receiving from the same mobile device a second anchor including:
a representation of a second location-identifying physical characteristic proximate to a mobile device present at a second location,
a descriptive identification of the second location, and
a second timestamp;
automatically generating a chronotope by linking the first anchor, comprising the representation of the first location-identifying physical characteristic, to the second anchor, comprising a representation of a second location-identifying physical characteristic, and calculating the time difference between the first timestamp and the second timestamp; and
storing the chronotope in a database, wherein the database does not comprise an association between the first anchor and a geographic coordinate pair.

20. The computer implemented method of claim 19, further comprising:
receiving a query including a current anchor and a destination anchor;
retrieving from the database a set of one or more chronotopes forming an association between the current anchor and the destination anchor.

21. The computer implemented method of claim 20, wherein:

the set of one or more chronotopes includes a first chronotope and a second chronotope;

the first chronotope associates the current anchor with an intermediate anchor; and the second chronotope associates the intermediate anchor with the destination anchor.

22. The computer implemented method of claim 19, further comprising:

receiving a query including a current anchor and a criterion specified by a user;

identifying a set of one or more destinations matching the user-specified criterion; and limiting the set of one or more destinations to destinations associated with the current anchor by one or more chronotopes.

23. The computer implemented method of claim 22, further comprising limiting the set of one or more destinations based at least in part on a user preference retrieved from the database.

* * * * *